Figure 2:
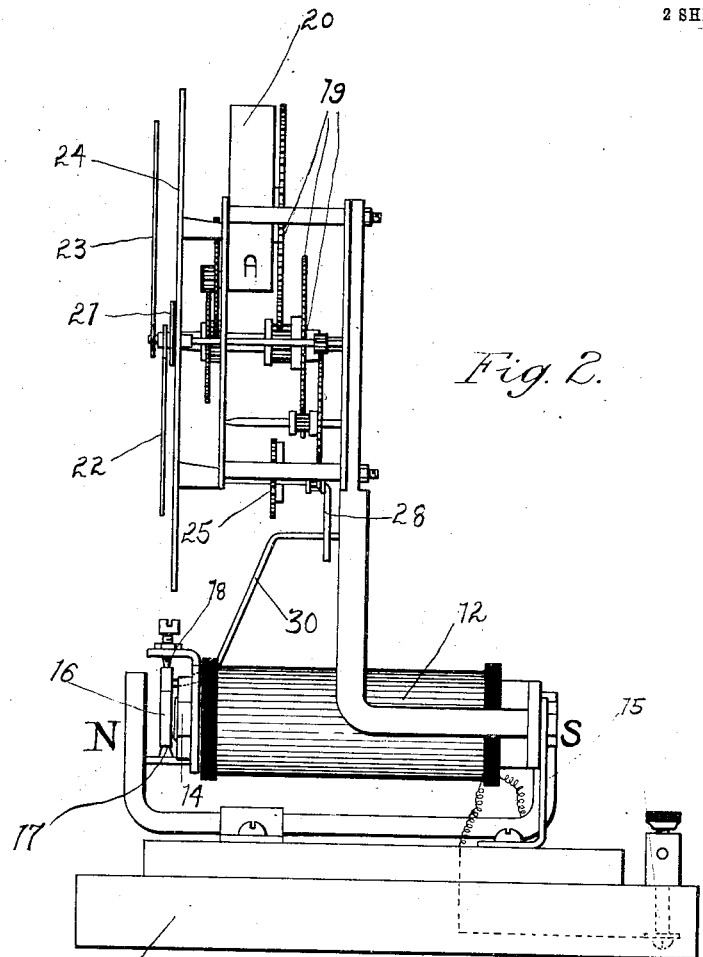

A. F. POOLE.
FREQUENCY METER.
APPLICATION FILED DEC. 16, 1907.
1,036,900.
Patented Aug. 27, 1912.
2 SHEETS—SHEET 1.
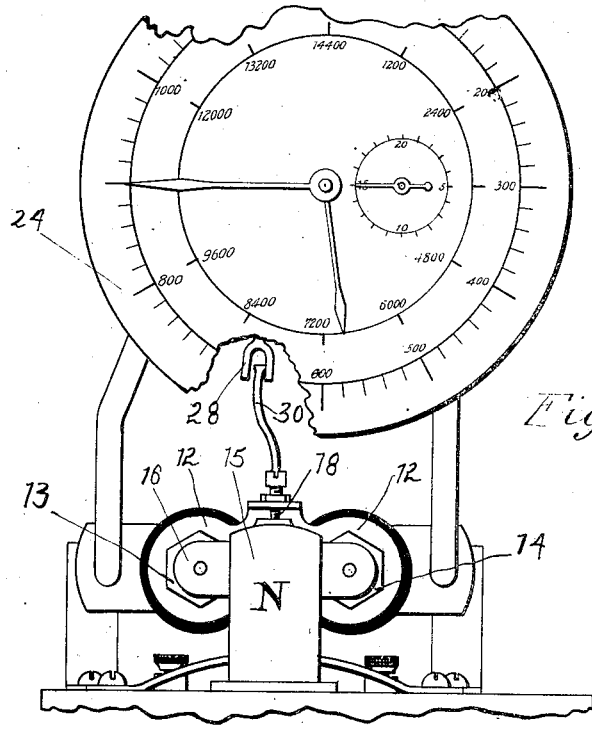
Fig. 1.
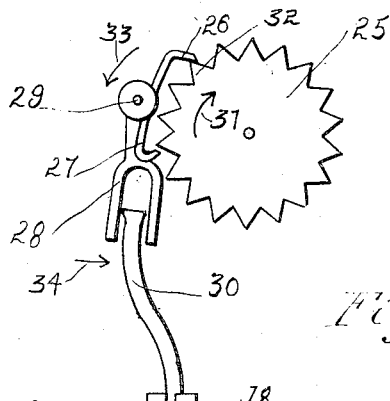
Fig. 3.
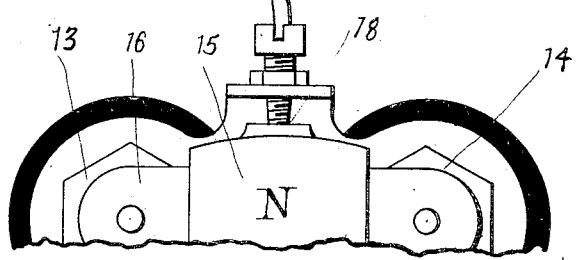
Witnesses
George C. Higham.
Leonard W. Novander.
Inventor
Arthur F. Poole
By Brown & Williams
Attorneys

A. F. POOLE.
FREQUENCY METER.
APPLICATION FILED DEC. 16, 1907.

1,036,900.

Patented Aug. 27, 1912.
2 SHEETS—SHEET 2.

Witnesses
George C. Higham.
Leonard W. Novander

By

Inventor
Arthur F. Poole
Brown Williams
Attorneys

UNITED STATES PATENT OFFICE.

ARTHUR F. POOLE, OF WHEELING, WEST VIRGINIA, ASSIGNOR TO HOLTZER-CABOT ELECTRIC COMPANY, OF BROOKLINE, MASSACHUSETTS, A CORPORATION OF MASSACHUSETTS.

FREQUENCY-METER.

1,036,900.  Specification of Letters Patent. Patented Aug. 27, 1912.

Application filed December 16, 1907. Serial No. 403,594.

*To all whom it may concern:*

Be it known that I, ARTHUR F. POOLE, a citizen of the United States, residing at Wheeling, in the county of Ohio and State of West Virginia, have invented a certain new and useful Improvement in Frequency-Meters, of which the following is a full, clear, concise, and exact description, reference being had to the accompanying drawings, forming a part of this specification.

The invention herein described and claimed is intended for measuring the frequency of alternating or pulsating currents of electricity.

There are in use at the present time certain devices for measuring the frequency of such currents at a distance from the central station. One of the best frequency meters of this type is that in which there is a plurality of tuned reeds, each reed having a natural rate of vibration differing from that of other reeds of the set. An electromagnet may be connected with the circuit whose frequency is to be measured, and this electromagnet acts upon the reeds to cause their vibration. When the periodicity of the current to be measured corresponds with the natural rate of vibration of any reed of the set, that particular reed will be set in vibration. The natural rate of the reed being known, the frequency of the current to be measured is thus ascertained. When the frequency to be measured falls midway between that of two reeds, both reeds will be set in vibration, but through a smaller amplitude than in the case in which the frequency of the current corresponds exactly with that of one of the reeds. When two reeds are thus set in vibration, the observer knows that the frequency of the current which is being measured is somewhere between that of the natural rates of vibration of the two reeds. Such a frequency meter is not absolutely accurate in its measurements, and the determination of the frequency of a current which is being measured involves to a considerable extent the personal equation of the man who is reading the instrument. Furthermore, this vibrating reed meter requires very considerable care in its manufacture, and is quite expensive.

My invention provides a far cheaper frequency meter, and one which is more accurate in the determination of the precise frequency of the current in question.

The preferred form of my invention has been designed especially for use in determining the frequency of alternating ringing currents used in the operation of harmonic and multi-frequency party line telephone systems of the selective type. It is, however, useful for other purposes, and may be applied to the measurement of the frequency of the current in power or lighting circuits, or in fact for the measurement of the frequency of any alternating or pulsating current, and is independent of the wave form.

The preferred embodiment of my invention comprises essentially a clock train with its escapement, the clock train driving suitable hands or pointers by which the degree of rotation or movement of the clock mechanism may be read; and in conjunction with this an electromagnetic mechanism controlling the escapement, the energizing coils of the electromagnet being connected with the circuit in which the frequency is to be measured. The vibration of the armature of the electromagnet thus connected in circuit is determined by the frequency of the current in a circuit to be measured. The armature in turn controls the escapement and the escapement the clock train, so that the rotation of the clock hands may be used as an index of the number of reversals in the alternating current. By using a stop watch and timing the movement of the hands upon their dial, a very accurate determination of the frequency in question may be made.

My invention and its method of use will be more clearly understood by reference to the accompanying drawings, in which—

Figure 4:
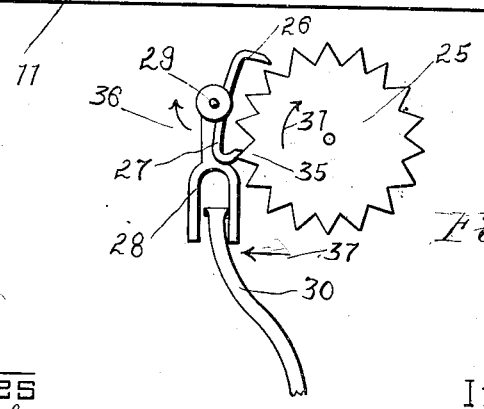

Figure 1 is a front view of the frequency meter of my invention, parts of the dial being broken away in order to more clearly illustrate the inner construction; Fig. 2 is a side elevation, Fig. 3 is an enlarged view of the armature and escapement mechanism, showing the pallets in one position, and Fig. 4 is a similarly enlarged view of the escapement showing the pallets in their alternative position.

Referring to these drawings, it will be seen that I have mounted upon a suitable base plate 11, the electromagnetic mechanism of a telephone ringer. This device comprises essentially the U-shaped electromagnet 12, whose poles appear at 13 and 14, a permanent polarizing magnet 15, and a pivotally mounted armature 16, the pivots of the armature being indicated at 17 and 18. Mounted upon the framework of the telephone ringer is the clock train 19, by means of which power is communicated from the mainspring 20 to the second hand 21, the hour hand 22 and the minute hand 23 in front of the dial 24. The mainspring is wound by a key in the usual manner and the hands can be "set" in a manner corresponding to that in which the hands of a time piece are adjusted. At the lower part of the clock train is shown the escapement wheel 25, which with the pivoted pallets 26 and 27 forms the well known anchor escapement. The forked lever 28 is mounted upon the rocking shaft 29, which carries the pallets 26 and 27. Extending from the pivot armature 16 to a position between the tines of the forked lever 28 is the connecting rod 30.

It will be understood that the mainspring, acting through the clock train, tends to rotate the escapement wheel 25 in the direction of the arrow 31. When the escapement is in the position shown in Fig. 3, the tooth 32 exerts a pressure upon the pallet 26 tending to rock the shaft in the direction of the arrow 33. This pressure upon the pallet will cause the left hand tine of the forked lever 28 to exert a pressure upon the connecting lever 30 in the direction of the arrow 34. Under normal conditions, however, this pressure is not quite sufficient to cause the armature to which the lever 30 is attached to swing into its alternative position, because the polarization which is effected by the permanent magnet 15 causes a slight magnetic attraction tending to hold the armature in that one of its alternative positions in which it happens at the time to be. When the escapement takes the position shown in Fig. 4, the tooth 35 will exert a pressure against the pallet 27 tending to rotate the rock shaft in the direction of the arrow 36. This will cause the forked lever 28 to exert a pressure upon the lever 30 in the direction of the arrow 37; as in the previous case, however, the slight pressure exerted by the escapement mechanism is not quite sufficient to throw the armature into the alternative position against the attraction due to the polarization of the electromagnet and armature. When, however, a current impulse is caused to flow in the proper direction through the winding of the electromagnet 12, the polarization due to the permanent magnet will be decreased to such an extent that the escapement will throw the armature into its reverse position. If now the current through the electromagnet winding is also reversed, the polarization will again be decreased to a point at which the escapement, having fallen into its alternative position, will throw the armature back into the first position. Thus, it will be understood that when an alternating current flows through the electromagnet winding, the armature will be caused to vibrate at a rate corresponding with the frequency of the current in the magnet windings. One tooth of the escapement wheel will therefore be passed for each cycle of the alternating current. The clock hands record the rotation of the escapement wheel, and, the gear ratios being properly pre-determined, the movement of the hands may be read direct as cycles of alternating current. I prefer to use a dial marked in the manner shown in the drawing, because this enables me to use the ordinary clock trains, which can be purchased very cheaply in the market. If, however, it is preferred to change the gear ratios of the clock train, the hands can be made to read in decimal multiples of one another.

It is a feature of particular value in the measurement of alternating currents of relatively small power, that the mainspring of the clock train acting through the escapement aids the current in causing the vibration of the armature. This will be apparent to those skilled in the art, when it is borne in mind that the frequency of alternating currents is sometimes extremely high and that under ordinary circumstances the armature of an electromagnet must have very slight inertia if it is to follow the reversals of a high frequency alternating current. The connection which exists between the mainspring of the clock train of the meter of my invention and the vibrating armature of the bell magnet is such as to produce the effect of a very light armature. This, of course, is due to the fact, as previously explained, that the escapement acts always with a tendency to swing the pallets and the vibrating mechanism associated therewith into their reversed position. The spring pressure, therefore, overcomes to a large extent the inertia which would otherwise be present in the somewhat heavy armature and lever mechanism, thus permitting the armature to vibrate strictly in accordance with the cyclic reversals of alternating currents of very high as well as of very low frequencies. Actual tests have shown that this instrument is capable of accurately recording such reversals at all commercial frequencies, whether for power or selective party line signaling, and that its operation is independent of the wave form of the alternating current.

While I have herein shown and described the preferred embodiment of my invention, it will be apparent to those skilled in the art that many modifications and changes may be made without departing from the spirit thereof; consequently, I do not wish to be limited to the precise form herein shown, but have endeavored to indicate the scope of my invention in the accompanying claims.

I claim as my invention:

1. In a frequency meter, a shaft, a pointer secured upon said shaft, a dial over which said pointer moves, a toothed wheel operatively connected with said shaft, an oscillating pallet member coöperating with the toothed wheel, an extension rigid with said pallet member and having a slot, a polarized electromagnet, an oscillating armature for said electromagnet, a part extending from said armature into the slot in said extension, the energization of said electromagnet thus causing the movement of said pallet member and the engagement between said pallet member and said toothed wheel being such that the operation of the former tends to drive the latter, and a spring associated with said shaft and tending to drive it in the direction in which the operation of the pallet tends to drive it, the shaft being thus operated by the combined efforts of said spring and said electromagnet when the latter is energized.

2. In a frequency meter, a shaft, a pointer secured upon said shaft, a dial over which said pointer moves, a toothed wheel operatively connected with said shaft, an oscillating pallet member coöperating with said wheel, a polarized electromagnet with a U-shaped core, an oscillating armature for said electromagnet pivoted midway between the two limbs at the open end of said U-shaped core, means for operatively connecting said armature with said pallet member, and a spring associated with said shaft and tending to drive it, the relation of said pallet member and said toothed wheel being such that the latter will be advanced one step for each energization of the electromagnet.

3. In a frequency meter, a shaft, a pointer secured upon said shaft, a dial over which said pointer moves, a toothed wheel operatively connected with said shaft, an oscillating pallet member coöperating with said wheel, a polarized electromagnet with a U-shaped core, an oscillating armature for said electromagnet pivoted midway between the two limbs at the open end of said U-shaped core, an arm extending rigidly from said armature, said arm being arranged to engage said pallet member, and a spring associated with said shaft and tending to drive it, the relation of said pallet member and said toothed wheel being such that the latter will be advanced one step for each energization of the electromagnet.

4. In a frequency meter, a shaft, a pointer secured upon said shaft, a dial over which said pointer moves, a second pointer independently mounted on said shaft, gearing for maintaining a constant velocity ratio between said pointers, a toothed wheel operatively connected with said shaft, an oscillating pallet member coöperating with the toothed wheel, a polarized electromagnet with a U-shaped core, an oscillating armature for said electromagnet pivoted midway between the two limbs of said core so as to be adapted to respond to high rates of reversals of current, said electromagnet being directly mechanically connected with said pallet member and its kinetic energy being confined to these directly associated parts, and a spring associated with said shaft and tending to drive it, said first-named pointer being advanced one step for each energization of the electromagnet.

In witness whereof, I hereunto subscribe my name this 12th day of December, A. D., 1907.

ARTHUR F. POOLE.

Witnesses:
FRED W. KOEHN,
GEORGE E. HIGHAM.